US012780600B2

(12) United States Patent
Saito et al.

(10) Patent No.: US 12,780,600 B2
(45) Date of Patent: Nov. 3, 2026

(54) ELEVATOR AND CONTROL METHOD FOR THE SAME

(71) Applicant: Hitachi, Ltd., Tokyo (JP)

(72) Inventors: Taichi Saito, Tokyo (JP); Tomoaki Maehara, Tokyo (JP); Takahiro Hatori, Tokyo (JP); Yuki Saito, Tokyo (JP); Masaki Miyamae, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 828 days.

(21) Appl. No.: 18/032,644

(22) PCT Filed: Nov. 4, 2020

(86) PCT No.: PCT/JP2020/041161
§ 371 (c)(1),
(2) Date: Apr. 19, 2023

(87) PCT Pub. No.: WO2022/097188
PCT Pub. Date: May 12, 2022

(65) Prior Publication Data

US 2023/0391583 A1 Dec. 7, 2023

(51) Int. Cl.
*B66B 1/34* (2006.01)
*B66B 1/24* (2006.01)
*B66B 3/00* (2006.01)
*B66B 3/02* (2006.01)

(52) U.S. Cl.
CPC ............ *B66B 1/2458* (2013.01); *B66B 3/002* (2013.01); *B66B 3/02* (2013.01); *B66B 2201/23* (2013.01)

(58) Field of Classification Search
CPC .......... B66B 1/2458; B66B 3/002; B66B 3/02
USPC .......................................................... 187/380
See application file for complete search history.

(56) References Cited

U.S. PATENT DOCUMENTS 5,329,076 A * 7/1994 Kameli ................. B66B 1/2458 187/383
5,841,084 A * 11/1998 Thangavelu .......... B66B 1/2458 187/382
8,646,581 B2 * 2/2014 Iwata ...................... B66B 1/468 187/387

(Continued)

FOREIGN PATENT DOCUMENTS

JP 2-52880 A 2/1990
JP 2002-302348 A 10/2002

(Continued)

OTHER PUBLICATIONS

International Search Report (PCT/ISA/210) issued in PCT Application No. PCT/JP2020/041161 dated Jan. 19, 2021 with English translation (nine (9) pages).

(Continued)

*Primary Examiner* — Erick D Glass
(74) *Attorney, Agent, or Firm* — Crowell & Moring LLP

(57) ABSTRACT

An elevator includes a plurality of elevator units each including a car and a unit control section that controls operation of the car; and an operation management device that manages operation of the plurality of elevator units, in which, in a case where it is determined that any of the elevator units has left any of passengers behind, the operation management device additionally and immediately dispatches the car of another elevator unit to a floor where any of passengers has been left behind.

15 Claims, 12 Drawing Sheets

(56) References Cited

U.S. PATENT DOCUMENTS

| | | | | |
|---|---|---|---|---|
| 2009/0032339 | A1* | 2/2009 | Hikita | B66B 1/2458 187/247 |
| 2017/0291792 | A1* | 10/2017 | Scoville | B66B 1/3407 |
| 2020/0239268 | A1* | 7/2020 | Scoville | B66B 1/3476 |

FOREIGN PATENT DOCUMENTS

| | | | |
|---|---|---|---|
| JP | 2010-150013 | A | 7/2010 |
| JP | 2010-195529 | A | 9/2010 |
| JP | 2013-170034 | A | 9/2013 |
| JP | 2013-173595 | A | 9/2013 |
| JP | 2018-203454 | A | 12/2018 |
| JP | 2019-81622 | A | 5/2019 |
| WO | WO 2019/087249 | A1 | 5/2019 |
| WO | WO 2019/087250 | A1 | 5/2019 |

OTHER PUBLICATIONS

Japanese-language Written Opinion (PCT/ISA/237) issued in PCT Application No. PCT/JP2020/041161 dated Jan. 19, 2021 (six (6) pages).

* cited by examiner

ELEVATOR AND CONTROL METHOD FOR THE SAME

TECHNICAL FIELD

The present invention relates to an elevator and a control method for the elevator.

BACKGROUND ART

As technology relating to an elevator and a control method for the elevator, there is technology disclosed in PTL 1 described below. This PTL 1 describes "When it has been detected that a car is full of passengers, an automatically canceled landing call is re-registered . . . . Even if anyone is left behind because the car is full, a call is automatically registered, which saves the trouble of making the registration again".

CITATION LIST

Patent Literature

PTL 1: JP H02-52880 A

SUMMARY OF INVENTION

Technical Problem

However, registration of a landing call is automatically canceled in a case where a car is in a door open state in a landing. Therefore, in the above-described technology, it is necessary to make re-registration of a landing call after the door of a fully loaded car is closed; thus, it takes time for an additional car for left-behind passengers to arrive, and it is not possible to avoid the congestion in a landing.

Accordingly, an object of the present invention is to provide an elevator and a control method for the elevator that can avoid congestion in a landing in a case where the car occupancy exceeds a full-car threshold.

Solution to Problem

To solve the above problem, for example, a configuration described in claims is adopted.

The present application includes more than one means for solving the above problem; to take one example of those, an elevator includes: a plurality of elevator units each including a car and a unit control section that controls operation of the car; and an operation management device that manages operation of the plurality of elevator units, in which, in a case where it is determined that any of the elevator units has left any of passengers behind, the operation management device additionally and immediately dispatches the car of another elevator unit to a floor where any of passengers has been left behind.

Advantageous Effects of Invention

According to the present invention, it is possible to provide an elevator and a control method for the elevator that can avoid congestion in a landing in a case where the car occupancy exceeds a full-car threshold.

DESCRIPTION OF EMBODIMENTS

Figure 1:
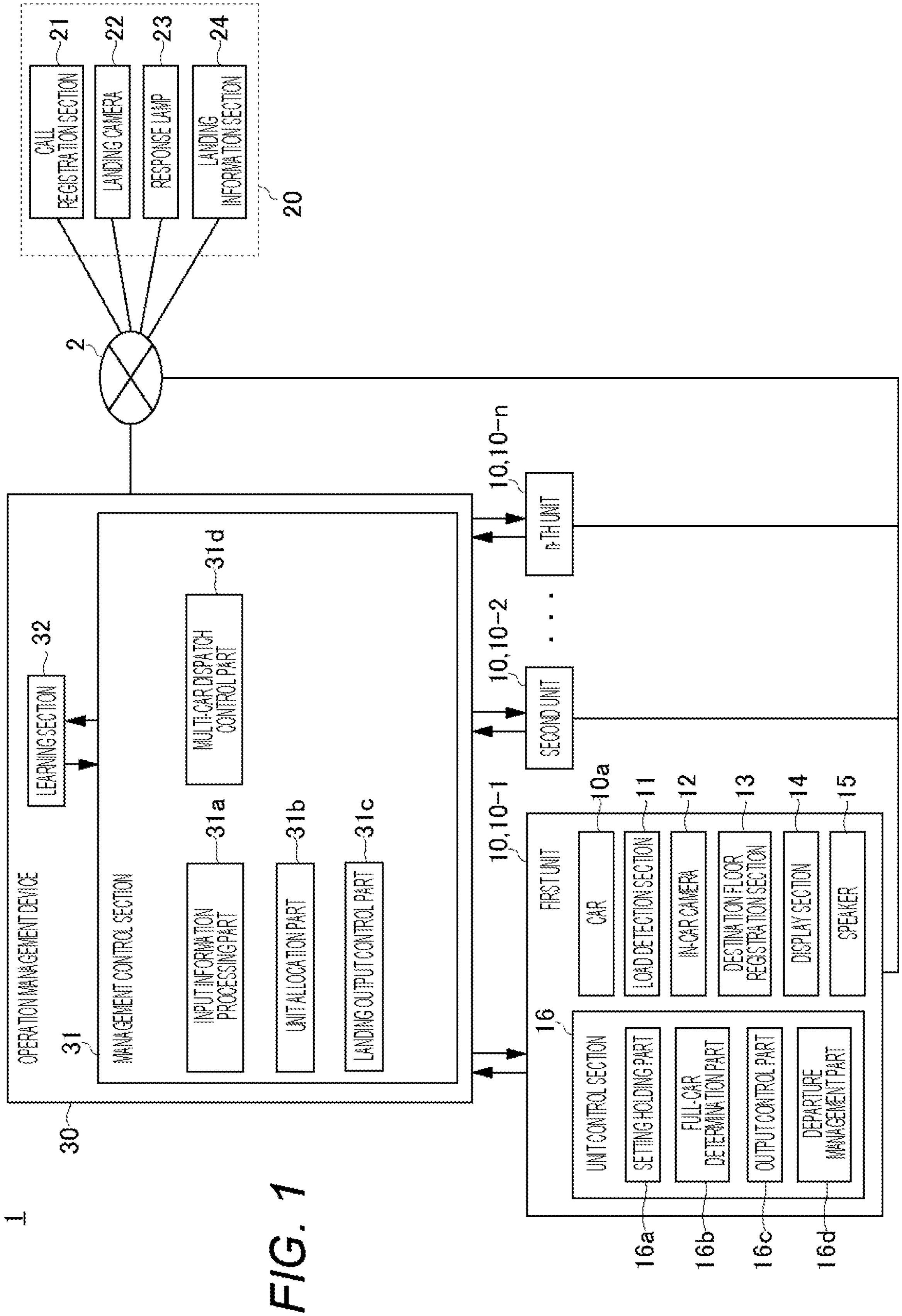
FIG. 1 is a system configuration diagram showing a schematic configuration of an elevator according to first and second embodiments.

Embodiments to which the present invention is applied will be described in detail below on the basis of drawings. It is noted that in the respective embodiments, similar components are assigned the same reference numeral, and repetition of description of the similar components is omitted.

First Embodiment

Configuration of Elevator

FIG. 1 is a system configuration diagram showing a schematic configuration of an elevator according to first and second embodiments. A configuration of an elevator 1 according to the first embodiment is described below on the basis of FIG. 1 and with reference to other drawings as necessary.

The elevator 1 shown in this diagram includes a plurality of (n) elevator units 10, a landing facility 20, and an operation management device 30 that manages the operation of the plurality of elevator units 10. These are connected to one another by a network 2. Details of the components constituting the elevator 1 are described below in order. It is noted that in the description of the present invention, an example is configured in a way that is generally easy to describe it; however, the configuration is not limited this. For example, the operation management device 30 and the elevator units 10 are separated in different configurations; however, the operation management device 30 may be included in the elevator unit 10. In this case, a master/slave configuration may be constructed among the elevator units 10, and the master unit may take on the role of the operation management device 30.

<Elevator Units 10>

The elevator units 10 are provided in a building, and this elevator 1 here includes n elevator units 10 that are first to n-th units 10-1 to **10-*n*. Each elevator unit 10 includes a car 10*a* and a hoist (not shown) for causing the car 10*a* to travel. The car 10*a*** has a car door (not shown) of which the opening and closing is freely controlled.

Furthermore, each elevator unit 10 includes a load detection section 11, an in-car camera 12, a destination floor registration section 13, a display section 14, a speaker 15, and a unit control section 16. These are as follows.

[Load Detection Section 11]

The load detection section 11 detects a load applied to the car **10*a* by a passenger or baggage having boarded the car 10*a*. A detected load value is transmitted to the unit control section 16**.

[In-Car Camera 12]

The in-car camera 12 takes an image of the inside of the car **10*a*. Information of the taken image is transmitted to the operation management device 30 through the unit control section 16** or directly.

Destination Floor Registration Section 13

The destination floor registration section 13 is for a passenger of the car **10*a* to register his/her destination floor; for example, each destination floor is registered by a button operation. Information of the destination floor specified by the button operation is transmitted to the operation management device 30 through the unit control section 16** or directly.

[Display Section 14]

The display section 14 displays information of a destination floor of the car **10*a*, etc. on the basis of an instruction from the unit control section 16. Such a display section 14 is one of informing means for informing passengers of the car 10*a*** of information.

[Speaker 15]

The speaker 15 makes a caution announcement, for example, that the car **10*a* is overloaded on the basis of an instruction from the unit control section 16. Such a speaker 15 is one of informing means for informing passengers of the car 10*a*** of information.

[Unit Control Section 16]

The unit control section 16 controls the traveling of the car **10*a* driven by the hoist, the opening and closing of the car door provided in the car 10*a*, the display on the display section 14, and the informing from the speaker 15 on the basis of information from the load detection section 11 and the in-car camera 12 and further an instruction from the operation management device 30. Such a unit control section 16** includes a calculator. The calculator is hardware used as a so-called computer, and may include a central processing unit (CPU), a random access memory (RAM), and a non-volatile storage unit such as a read-only memory (ROM) or a hard disk drive (HDD), and further a network interface. It is noted that as for a configuration of the calculator, the same applies to the subsequent embodiments.

The unit control section 16 includes function parts that are a setting holding part **16*a*, a full-car determination part 16*b*, an output control part 16*c*, and a departure management part 16*d*. Of these parts, the setting holding part 16*a* holds various setting values such as an overfull-car threshold and a full-car threshold for controlling the traveling of the car 10*a* of each elevator unit 10 and the opening and closing of the car door. These setting values shall be a value input from an external device. The full-car determination part 16*b* determines the congestion state of the inside of the car 10*a* on the basis of information held by the setting holding part 16*a* and information obtained from the load detection section 11 and the in-car camera 12. The output control part 16*c* controls the informing of information by the display section 14 and the speaker 15. The departure management part 16*d* performs control for causing the car 10*a* to travel on the basis of information from the full-car determination part 16*b* and the operation management device 30. These function parts execute their respective functions in accordance with a program stored in the calculator included in the unit control section 16**. The respective functions executed by the function parts will be described in detail in a control method for the elevator to be described later.

<Landing Facility 20>

The landing facility 20 is a facility provided in each landing, and includes a call registration section 21, a landing camera 22, a response lamp 23, and a landing information section 24. Each of these may individually be a plurality of ones installed in each landing, or may be one. In a case where a plurality of ones is provided, as an example, the ones shall be installed for each one of the landing doors corresponding to the elevator units 10. Subsequently, the call registration section 21, the landing camera 22, the response lamp 23, and the landing information section 24 are described in order.

[Call Registration Section 21]

The call registration section 21 is for a passenger to input a destination floor, and may be, for example, a numeric keypad type or may be configured to read identification information that the passenger has. The destination floor input or read through the call registration section 21 is transmitted to the operation management device 30.

[Landing Camera 22]

The landing camera 22 takes an image of a landing. This landing camera 22 only has to have a resolution enough to count, for example, the number of passengers waiting in the landing and an increase or decrease in the number of passengers. Furthermore, the landing camera 22 may be one of components constituting a personal identification system for passengers. The image taken by the landing camera 22 is subjected to image processing by, for example, a data processing section that is not shown in the diagram, and then transmitted to each elevator unit 10 and also transmitted to the operation management device 30.

[Response Lamp 23]

The response lamp 23 is a display section for informing passengers waiting in a landing of an elevator unit 10 arriving on a floor of the landing, and is installed to correspond to the landing door of each elevator unit 10. Such a response lamp 23 also has a function of informing of a traveling direction of the arrived car **10*a***, and, for example, turns on either one of two directions that are up and down directions, thereby informing passengers waiting in the landing of the arrival and the traveling direction of the car

[Landing Information Section 24]

The landing information section 24 informs of a variety of information regarding the operation of the elevator units on the basis of an instruction from the operation management device 30 to be described below. This landing information section 24 is, for example, a display section or a speaker, and performs the informing by a display or a sound.

<Operation Management Device 30>

The operation management device 30 is for managing the operation of the plurality of elevator units 10, and includes a calculator. Such an operation management device 30 includes, function parts, a management control section 31 and a learning section 32. These are as follows.

[Management Control Section 31]

The management control section 31 allocates the elevator units 10 to respective floors of the landings on the basis of information transmitted from each elevator unit 10, information transmitted from each landing facility 20, and information from the learning section 32 to be described next, and draws up an operation route of each elevator unit 10. Furthermore, the management control section 31 controls the turn-on of the response lamp 23 and the informing by the landing information section 24 in each landing facility 20.

Such a management control section 31 includes function parts that are an input information processing part 31*a*, a unit allocation part 31*b*, a landing output control part 31*c*, and a multi-car dispatch control part 31*d*. Of these parts, the input information processing part 31*a* controls information from each landing facility 20 and each elevator unit 10. The unit allocation part 31*b* controls the registration of a call to each elevator unit 10 and instructs the elevator unit 10 to register the call. The landing output control part 31*c* controls outputs from the response lamp 23 and the landing information section 24 in each landing facility 20. The multi-car dispatch control part 31*d* controls concentration of dispatches to a given landing in a given period.

These function parts execute their respective functions in accordance with a program stored in the calculator included in the management control section 31. The respective functions executed by the function parts will be described in detail in a control method for the elevator to be described later.

[Learning Section 32]

Figure 2:
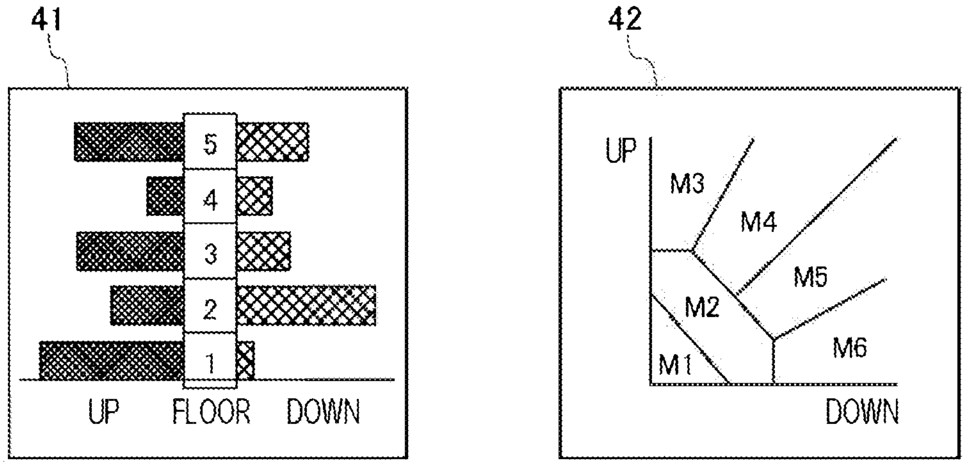
FIG. 2 is a diagram for explaining a traffic demand situation created by a learning section of the elevator.

The learning section 32 selects a driving program on the basis of a variety of information, and instructs the management control section 31 to perform operation control based on this driving program. FIG. 2 is a diagram for explaining a function of the learning section 32 of the elevator 1. Referring to FIGS. 2 and 1, the learning section 32 creates usage data 41 indicating the number of passengers getting on and off on each floor per unit time slot as one of traffic demand situations on the basis of, for example, information collected from the landing camera on each floor. Furthermore, the learning section 32 learns a traffic flow (also referred to as a people flow) representing a flow of passengers of each elevator unit 10 on the basis of operation data of the elevator 1 accumulated in the past, and generates a learning result (traffic modes M1 to M6). The generated traffic modes M1 to M6 are dividedly represented on coordinates 42, where the horizontal axis indicates the number of passengers getting on and off the down elevator, and the vertical axis indicates the number of passengers getting on and off the up elevator. Moreover, the learning section 32 selects an optimum driving program for the current traffic mode from driving programs generated by an intelligence section that is not shown in the diagram, and instructs the management control section 31 to perform operation control based on this driving program.

-Control Method for Elevator of First Embodiment-

Figure 3:
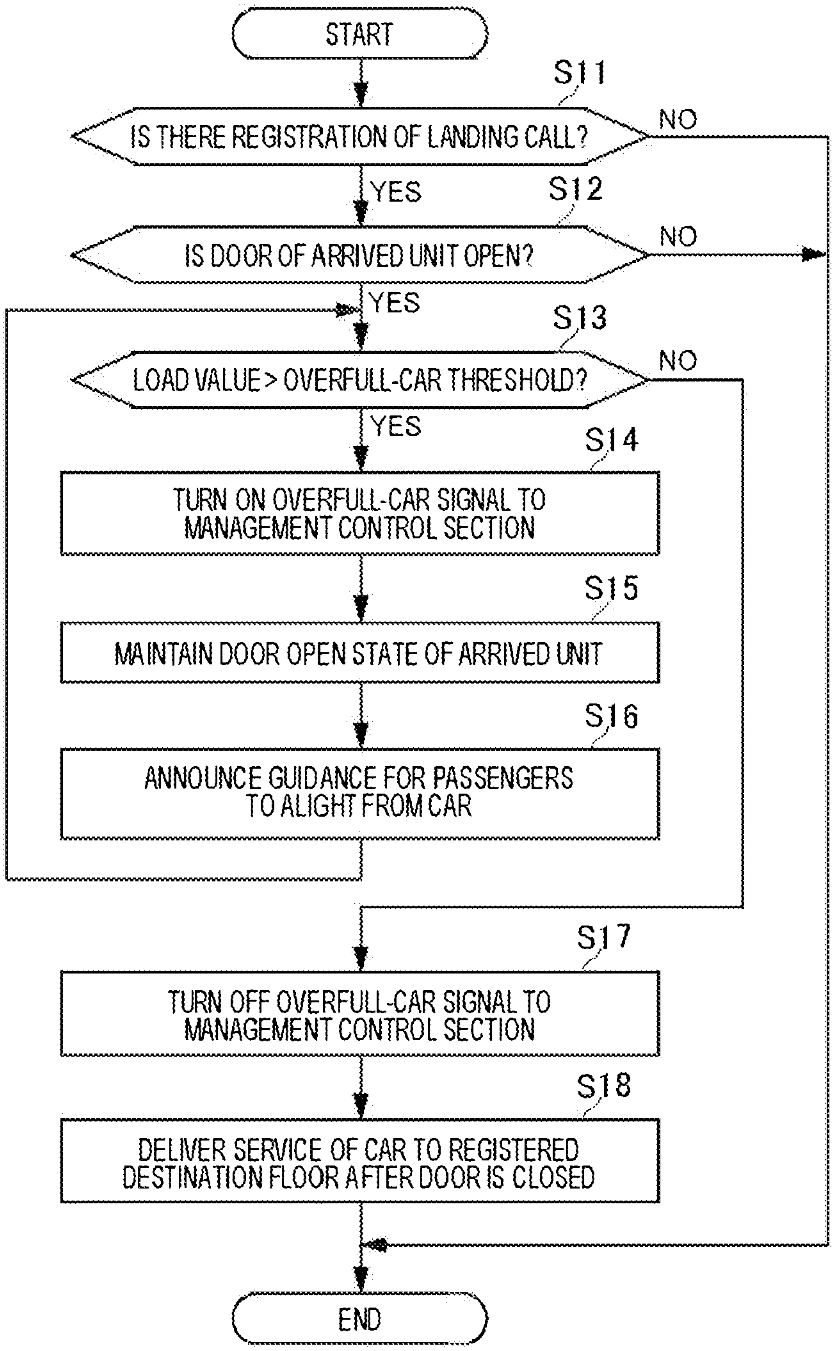
FIG. 3 is a flowchart showing, of a control method of the elevator according to the first embodiment, control performed by a unit control section.
Figure 4:
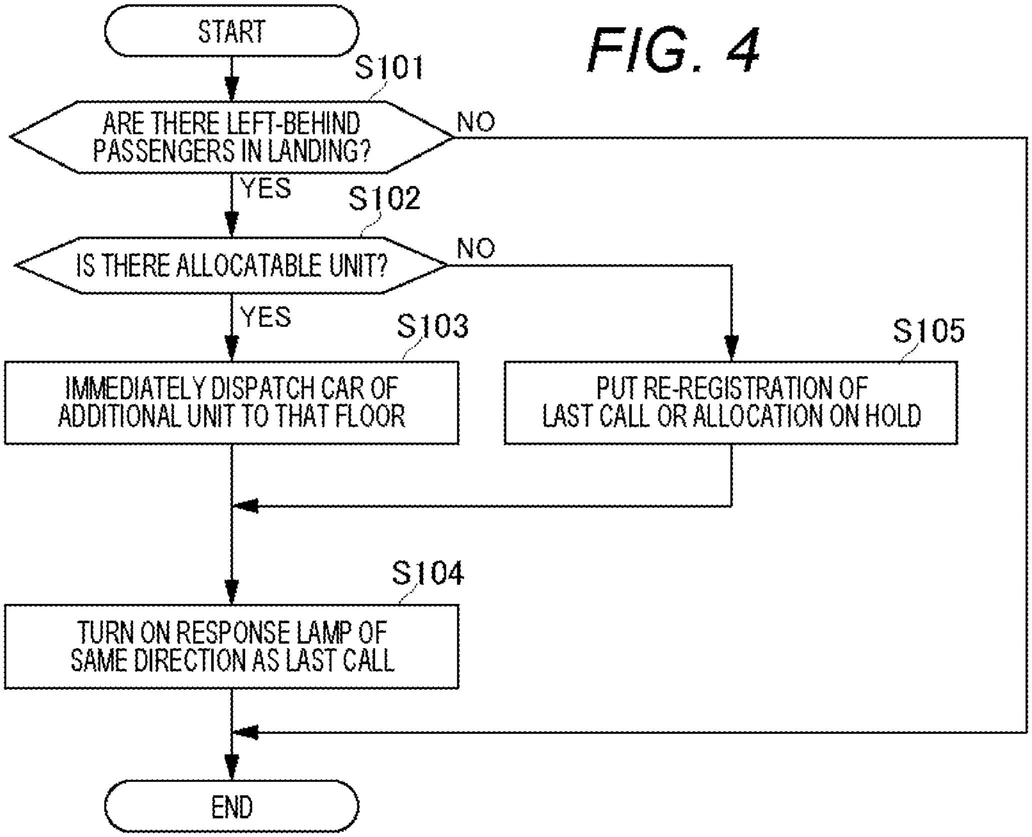
FIG. 4 is a flowchart showing, of the control method for the elevator according to the first and second embodiments, control performed by an operation management device.

Subsequently, a control method for the elevator of the first embodiment implemented by the elevator 1 described above is described. FIG. 3 is a flowchart showing, of the control method for the elevator 1 according to the first embodiment, control performed by the unit control section, and shows the procedure of control performed when the car is overfull by the unit control section 16 of each elevator unit 10. Furthermore, FIG. 4 is a flowchart showing, of the control method for the elevator according to the first embodiment, control performed by the operation management device, and shows the procedure of control performed by the management control section 31 of the operation management device 30. The overfull here means a state in which the inside of the car 10*a* is extremely congested and a state in which the departure of the car 10*a* needs to be suppressed.

With reference to FIG. 1, the control method for the elevator according to the first embodiment is described below in the order in accordance with the flowcharts of FIGS. 3 and 4. It is noted that these flows shall be periodically repeated.

<Control by Unit Control Section 16 (FIG. 3)>

First, on the basis of the flow of FIG. 3, the procedure of the control performed when the car is overfull by the unit control section 16 of each elevator unit 10 is described with reference to FIG. 1.

[Step S11]

In step S11, the departure management part 16*d* determines whether or not an instruction to register a landing call has been received from the unit allocation part 31*b* of the management control section 31. In a case where it is determined that the instruction has been received (YES), the car 10*a* is caused to travel to a floor where the instruction to register a landing call has been issued, and the control process moves on to step S12. On the other hand, In a case where it is determined that no instruction has been received (NO), the process ends.

[Step S12]

In step S12, in a case where the departure management part 16*d* determines that the car 10*a* registered in step S11 has arrived on the floor where the instruction to register a landing call has been issued and the door of the car 10*a* has been opened (YES), the process moves on to the next step S13; in a case where it is determined that the door has not been opened (NO), the process ends.

[Step S13]

In step S13, the full-car determination part 16*b* determines whether or not a load value detected by the load detection section 11 exceeds the overfull-car threshold. The overfull-car threshold here is a threshold set with respect to the load value to suppress the departure of the car 10*a* and is a value held by the setting holding part 16*a* in advance; however, it may be a value input from an external device and held by the setting holding part 16*a* of each elevator unit 10 in some cases. Such an overfull-car threshold is a value of about 110% of the rated loading capacity of each elevator unit 10 under normal circumstances.

In this case, the full-car determination part 16*b* performs this determination by comparing the load value detected by the load detection section 11 with the overfull-car threshold held by the setting holding part 16*a*, and, in a case where it determines that the load value exceeds the overfull-car threshold (YES), the process moves on to step S14. On the other hand, in a case where the full-car determination part 16*b* determines that the load value detected by the load detection section 11 does not exceed the overfull-car threshold (NO), the process moves on to step S17.

[Step S14]

In step S14, the full-car determination part 16*b* turns on an overfull-car signal to be transmitted to the management control section 31. This starts the transmission of the overfull-car signal to the management control section 31.

[Step S15]

In step S15, the departure management part 16*d* maintains the door open state of the car door on the floor where the instruction to register a landing call has been issued. Through that process, control of suppressing the departure of the car 10*a* from the floor on is put into effect when it has been detected that the car is overfull.

[Step S16]

In step S16, the output control part 16*c* instructs the speaker 15 to inform of guidance for passengers to alight from the car. Thus, the speaker 15 makes an announcement of guidance for passengers to alight from the car due to an overfull state. After that, returning to step S13, and processes in steps S13 to S16 are repeated until it is determined in step S13 that the load value does not exceed the overfull-car threshold (NO), i.e., until the load value of the inside of the car 10*a* is decreased to be equal to or lower than the overfull-car threshold by passengers getting off the car 10*a* or for some other reason.

[Step S17]

On the other hand, step S17 is a step to which the process moves on when it is determined in step S13 that the load value does not exceed the overfull-car threshold (NO). In this step S17, the full-car determination part 16*b* turns off the overfull-car signal to be transmitted to the management control section 31.

[Step S18]

In step S18, the departure management part 16*d* closes the door of the car 10*a*, and then causes the car 10*a* to travel toward the registered destination floor. After that, the process ends.

<Control by Operation Management Device 30 (FIG. 4)>

Subsequently, on the basis of the flow of FIG. 4, the procedure of control for immediate car dispatch performed by the management control section 31 of the operation management device 30 is described with reference to FIG. 1.

[Step S101]

In step S101, the input information processing part 31*a* determines whether or not any of passengers has been left behind in any of landings. Here, it is determined by whether or not an overfull-car signal has been received from, for example, the first unit 10-1. When an overfull-car signal has been detected, control of suppressing the departure of the car 10*a* of the unit (for example, the first unit 10-1) is performed, and an announcement of calling for passengers to alight from the car is issued. That is, it can be seen that one or more persons are inevitably left in the landing. Therefore, the detection of an overfull-car signal is synonymous with the presence of left-behind passenger(s). The overfull-car signal is a signal transmitted from the full-car determination part 16*b* of the unit control section 16 in step S14 of FIG. 3. It is noted that whether any of the passengers has been left behind in a landing may be determined by a detection means of the landing, such as the landing camera 22. In a case where it is determined in step S101 that any of passengers has been left behind (YES), the process moves on to step S102, otherwise the process ends.

[Step S102]

In step S102, the unit allocation part 31*b* determines whether or not there is an allocatable unit. At this time, if there is an elevator unit 10 of which the car 10*a* can be dispatched in the plurality of elevator units 10 other than the unit (here, for example, the first unit 10-1) that has left any of the passengers behind, except for a unit that cannot dispatch the car, the unit allocation part 31*b* determines that there is an allocatable unit (YES), and the process moves on to step S103. On the other hand, if there is no elevator unit 10 that can dispatch the car in the elevator units 10 other than the first unit 10-1 that has left any of the passengers behind, the unit allocation part 31*b* determines that there is no allocatable unit (NO), and the process moves on to step S105.

[Step S103]

In step S103, the unit allocation part 31*b* additionally and immediately dispatches the car of the elevator unit 10 determined to be an allocatable unit to a landing where any of the passengers has been left behind. Thus, the car of the additional elevator unit 10 is immediately dispatched to the landing where any of the passengers has been left behind.

[Step S104]

In step S104, the landing output control part 31*c* transmits, to the response lamp 23 installed to correspond to the additional elevator unit 10 in the landing where any of the passengers has been left behind, an instruction to turn on a light that indicates the same direction as the last call. Thus, the response lamp 23 on the arrival floor turns on the light that indicates the same direction as the last call.

[Step S105]

On the other hand, step S105 is a step to which the process moves on when it is determined in step S102 that there is no allocatable unit (NO). The unallocatable unit here means, as an always unallocatable unit, a unit that cannot respond to a landing call, such as a unit that is out of order or under maintenance and inspection. Furthermore, as for a unit that cannot be allocated temporarily, it indicates a case where the overfull car described in the foregoing part has been detected, and the car 10*a* of the unit 10 is temporarily in no fit state to allow passengers to get on or a state that prohibits people from riding together because it is in special driving and does not respond to a landing call. In this step S105, the call registration section 21 re-registers the last landing call instructed with respect to the first unit 10-1 that has left any of the passengers behind. Then, the allocation of the re-registered landing call is put on hold, and the process ends. Thus, even if the car 10*a* of the first unit 10-1 that has left any of the passengers behind is in the door open state on the floor where the instruction to register the landing call has been issued, the re-registered landing call is not canceled. Therefore, after the first unit 10-1 that has left any of the passengers behind has departed the arrival floor, without a user again registering a call through the call registration section 21 of the landing facility 20, when an allocatable unit becomes available from a temporarily unallocatable state, the landing call is allocated to the unit. Furthermore, in a case where a unit that is under inspection or an out-of-order unit has become available for car dispatch, the unit may be dispatched. After this step S105 is performed, the process moves on to step S104.

Effects of First Embodiment

According to the control method of the first embodiment described above, in a case where it is confirmed that any of the elevator units 10 has left passenger(s) behind in a landing, the car of an additional unit is immediately dispatched to the landing where the left-behind passenger(s) is present by the unit allocation part 31*b* of the management control section 31. Therefore, the left-behind passenger(s) on the arrival floor of the first unit 10-1 can get on the next unit arrived after a shorter waiting time. As a result, it is possible to efficiently dispatch the car 10*a* to passengers who could not get on the car 10*a* and have been waiting in a landing, which makes it possible to avoid the congestion in the landing. Furthermore, even in a case where there is no allocatable unit at the point when the management control section 31 has confirmed the left-behind passengers in the landing, the last landing call is automatically re-registered by the call registration section 21, and the allocation of a unit is put on hold; therefore, it is possible to save a passenger waiting in the landing the trouble of re-registering a landing call.

Second Embodiment

The second embodiment is a modification example of the first embodiment, and is an example in a case where a full-car threshold used for determination in a case where full-car passage is performed is set. The full-car passage means a state in which even if a landing call is made, it is necessary to pass through a floor where the landing call has been made because the inside of the car 10*a* is in a crowded state. The second embodiment like this differs from the first embodiment in the respective programs that the unit control section 16 and the management control section 31 constituting the elevator 1 described with FIG. 1 in the first embodiment have. Therefore, only a control method for the elevator is described below.

Control Method for Elevator of Second Embodiment

Figure 5:
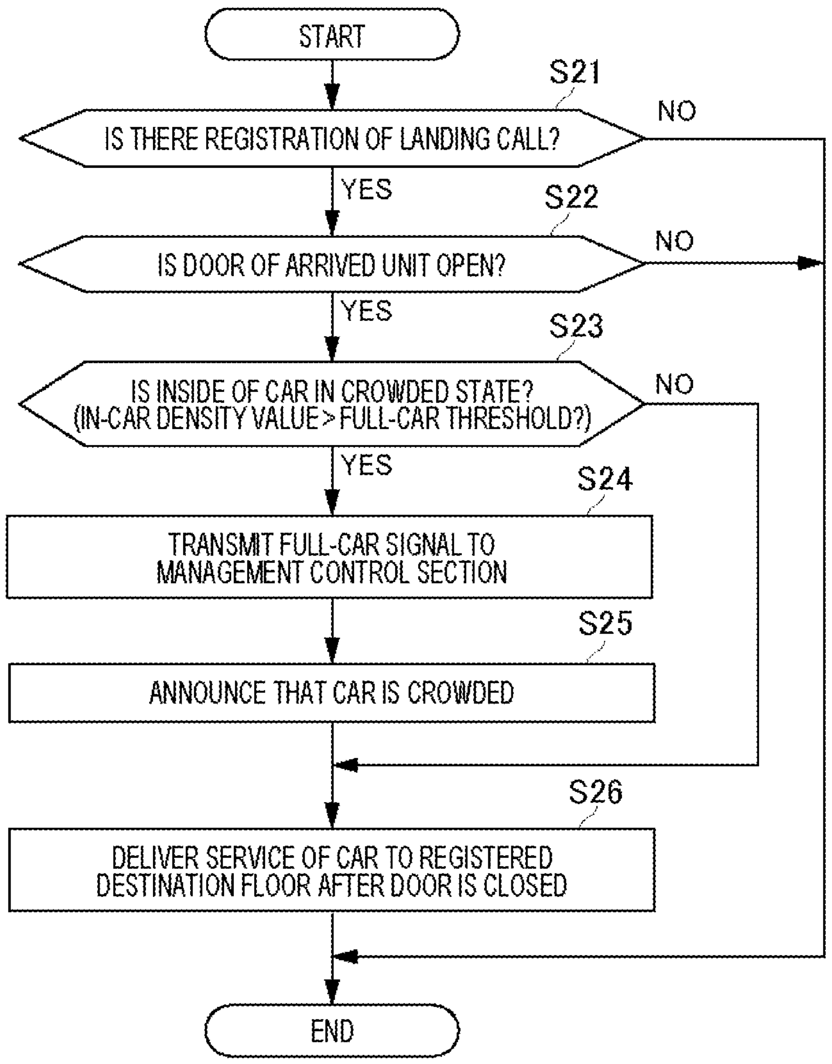
FIG. 5 is a flowchart showing, of the control method of the elevator according to the second embodiment, control performed by the unit control section.

FIG. 5 is a flowchart showing, of the control method for the elevator 1 according to the second embodiment, control performed by the unit control section 16. Of the control method for the elevator 1 according to the second embodiment, control performed by the operation management device 30 is similar to FIG. 4. With reference to FIG. 1, the control method for the elevator according to the second embodiment is described below in the order in accordance with the flowcharts of FIGS. 5 and 4. It is noted that these flows shall be periodically repeated.

<Control by Unit Control Section 16 (FIG. 5)>

First, on the basis of the flow of FIG. 5, the procedure of the control performed in a case where the inside of the car is in a crowded state by the unit control section 16 of each elevator unit 10 is described with reference to FIG. 1.

[Step S21]

In step S21, the departure management part 16*d* determines whether or not an instruction to register a landing call has been received from the unit allocation part 31*b* of the management control section 31. In a case where it is determined that the instruction has been received (YES), the car 10*a* is caused to travel to a floor where the instruction to register a landing call has been issued, and the control process moves on to step S22. On the other hand, In a case where it is determined that no instruction has been received (NO), the process ends.

[Step S22]

In step S22, in a case where the departure management part 16*d* determines that the car 10*a* has arrived on the floor where the instruction to register a landing call has been issued and the door of the car 10*a* has been opened (YES), the process moves to the next step S23; in a case where the door has not been opened (NO), the process ends.

[Step S23]

In step S23, to determine whether or not the inside of the car 10*a* of the elevator unit 10 is in a crowded state, the full-car determination part 16*b* determines whether or not an in-car density value exceeds a full-car threshold. The in-car density value here only has to be a value indicating a crowded state (a congestion state) of the inside of the car 10*a*, and is, for example, a load value of the car 10*a*, the number of boarding passengers, or an unexposed floor area ratio. Furthermore, the full-car threshold is a value used for determination in a case where full-car passage is performed in normal operation, and is an allowable maximum in-car density value for a congestion state of the inside of the car 10*a*. Such a full-car threshold is a value input from an external device and held by the setting holding part 16*a* of each elevator unit 10, and is set to, for example, a value of about 50% of the rated loading capacity of each elevator unit 10.

Furthermore, in a case where the in-car density value is the number of boarding passengers in the car, the full-car determination part 16*b* detects the number of boarding passengers in the car 10*a* on the basis of, for example, image information from the in-car camera 12, and compares the detected number of boarding passengers with a threshold calculated by the capacity and the full-car threshold of each unit held by the setting holding part 16*a*.

Moreover, in a case where the in-car density value is an exposed floor area ratio of the car 10*a*, the full-car determination part 16*b* detects an unexposed floor area occupied in the floor area of the car 10*a*, for example, on the basis of a value obtained by binarizing the image information from the in-car camera 12 or on the basis of range image information from a 3D camera used as the in-car camera 12. For example, in a case where there is no user in the car 10*a*, and only the floor face has been detected, the unexposed floor area is 0%. Furthermore, in a case where the entire floor area is in a jam-packed state, the unexposed floor area is 100%. Then, the detected unexposed floor area is compared with the full-car threshold held by the setting holding part 16*a*.

In a case where the full-car determination part 16*b* determines that the in-car density value exceeds the full-car threshold and the inside of the car is crowded (YES), the process moves on to step S24; in a case where it is determined that the in-car density value does not exceed the full-car threshold and the inside of the car is not crowded (NO), the process moves on to step S26.

[Step S24]

In step S24, the full-car determination part 16*b* transmits, to the management control section 31, a full-car signal for informing that the in-car density value exceeds the full-car threshold.

[Step S25]

In step S25, the output control part 16*c* instructs the speaker 15 to inform that the car is full and in a crowded state. Thus, the speaker 15 makes an announcement informing that the inside of the car 10*a* is in a crowded state.

[Step S26]

In step S26, the departure management part 16*d* closes the door of the car 10*a*, and then causes the car 10*a* to travel toward the registered destination floor. After that, the process ends.

<Control by Operation Management Device 30 (FIG. 4)>

Subsequently, on the basis of the flow of FIG. 4, the procedure of control performed in a case where the inside of the car is in a crowded state by the management control section 31 of the operation management device 30 is described with reference to FIG. 1. Here, a method of determining whether or not there are left-behind passengers in a landing in step S101 is different from that of the first embodiment. Therefore, only step S101 is described.

[Step S101]

In step S101, the input information processing part 31*a* determines whether or not any of passengers has been left behind in any of landings. Here, it is determined by a decrease in the load value of the inside of the car of, for example, the first unit 10-1 by a fixed value or more having been detected after a full-car signal has been received from the first unit 10-1. After a full-car state has been detected, when an announcement of the car being crowded is made, since it is assumed that a user's psychological state may cause him/her to get off the car because it is in a crowded state, the presence of left-behind passenger(s) is detected by a change in load after the announcement of a crowded state. This full-car signal is a signal transmitted from the full-car determination part 16*b* of the unit control section 16 in step S24 of FIG. 5. The load value of the inside of the car is acquired from the load detection section 11 of the first unit 10-1. In a case where the input information processing part 31*a* has determined the presence of left-behind passenger(s) in step S101 (YES), the process moves on to step S102, otherwise the process ends.

Effects of Second Embodiment

According to the control method of the second embodiment described above, in a case where the load value of the inside of the car 10*a* of the elevator unit 10 that has transmitted a full-car signal is decreased, and thereby it is detected that any of passengers has got off the car 10*a*, the unit allocation part 31*b* of the management control section 31 immediately dispatches the car of an additional unit to the arrival floor of the elevator unit 10 that has transmitted the full-car signal. Therefore, it is possible to efficiently dispatch the car 10*a* also for a passenger who has got on the car on the arrival floor of the first unit 10-1 and voluntarily got off the car because the car is full, which makes it possible to avoid the congestion in the landing.

Third Embodiment

Configuration of Elevator

Figure 6:
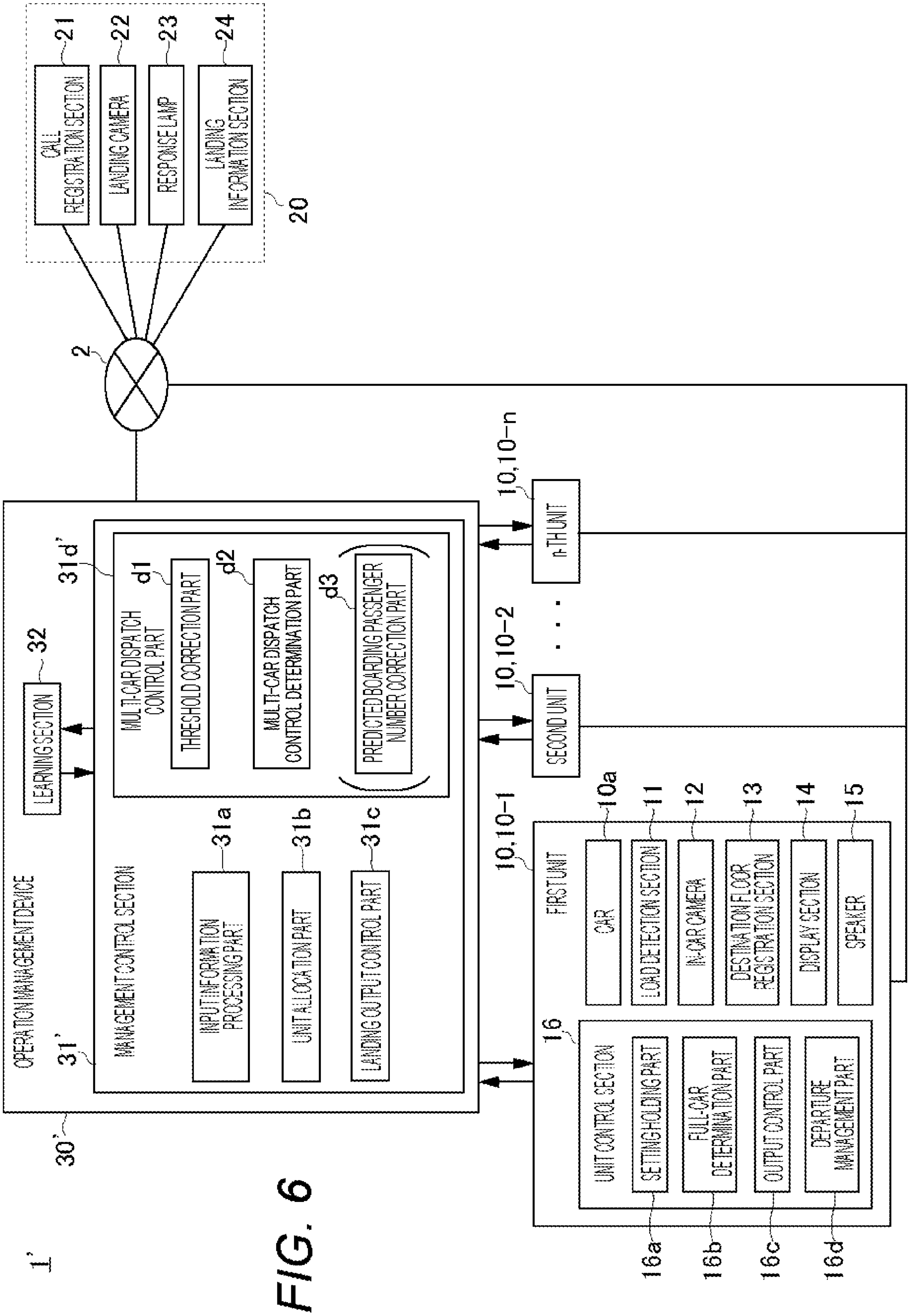
FIG. 6 is a system configuration diagram showing a schematic configuration of an elevator according to third and fourth embodiments.

FIG. 6 is a system configuration diagram showing a schematic configuration of an elevator 1' according to third and fourth embodiments. The elevator 1' of the third embodiment shown in this diagram has a configuration in which the full-car threshold used for determination in a case where full-car passage is performed in normal operation is changed to a different value from a reference value, for example, for the purpose of ensuring the social distance between passengers.

Such a system configuration of the elevator 1' of the third embodiment shown in FIG. 6 differs from the system configuration of the elevator 1 of the first and second embodiments shown in FIG. 1 in a configuration of a multi-car dispatch control part 31*d'* included in a management control section 31' of an operation management device 30'. Other configurations are similar to those of the elevator 1 of the first and second embodiments shown in FIG. 1. Therefore, here, the configuration of the multi-car dispatch control part 31*d'* is described.

<Operation Management Device 30'>

[Management Control Section 31']

The multi-car dispatch control part 31*d'* of the management control section 31' includes a threshold correction part d1 and a multi-car dispatch control determination part d2. It is noted that a predicted boarding passenger number correction part d3 in FIG. 6 is a configuration of the following fourth embodiment, and thus its description is omitted here.

Of these, the threshold correction part d1 is a part that corrects each threshold used for multi-car dispatch control. Furthermore, the multi-car dispatch control determination part d2 is a part that determines whether multi-car dispatch control is performed and calculation of the number of cars to be dispatched. Details of the control performed by the threshold correction part d1 and the multi-car dispatch control determination part d2 are described in detail in a control method for the elevator described later.

Control Method for Elevator of Third Embodiment

Subsequently, a control method for the elevator of the third embodiment implemented by the elevator 1' described above is described. The control method for the elevator of the third embodiment is a control method performed in a configuration in which the full-car threshold used for determination of whether or not the inside of the car is in a crowded state in the control method for the elevator of the second embodiment can be changed. First, control of the elevator unit by the unit control section 16 is described below, and, next, each control by the operation management device 30' is described.

<Control of Elevator Unit 10 by Unit Control Section 16 (FIG. 7)>

Figure 7:
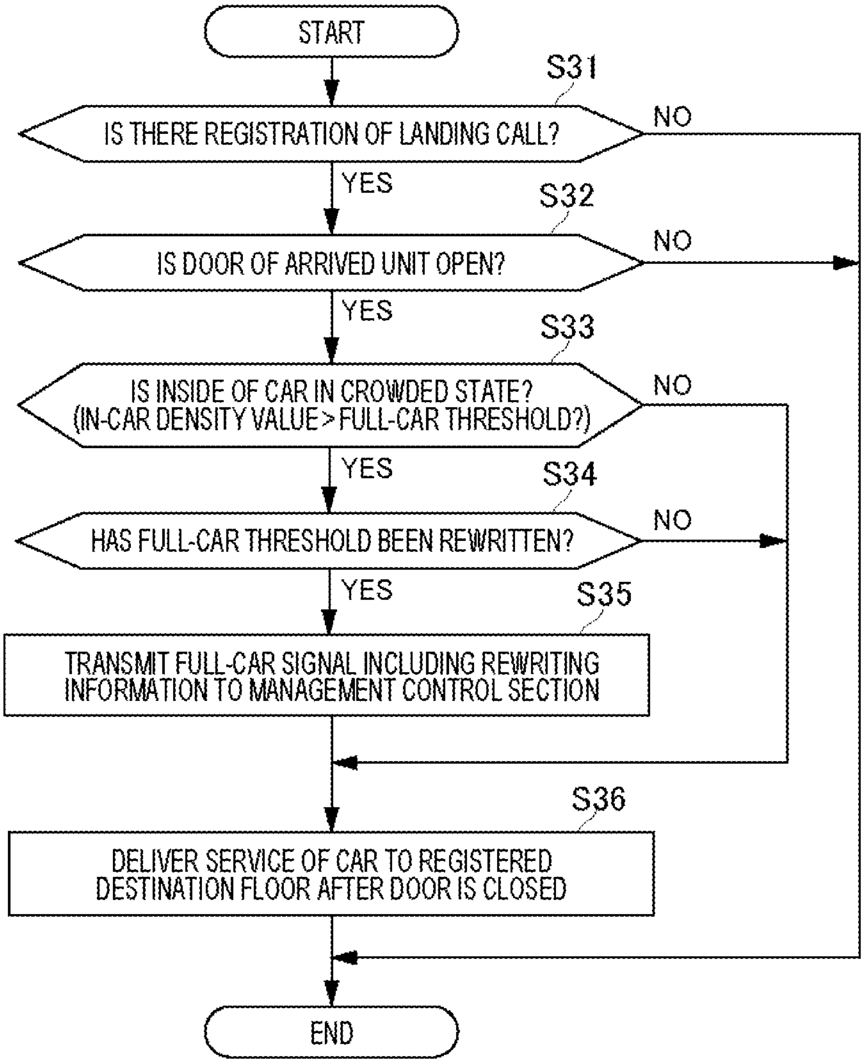
FIG. 7 is a flowchart showing, of a control method of the elevator according to the third embodiment, control performed by the unit control section.

FIG. 7 is a flowchart showing, of the control method for the elevator according to the third embodiment, control performed by the unit control section. With reference to FIG. 6, control of the elevator unit 10 in the control method for the elevator of the third embodiment is described below in the order in accordance with the flowchart of FIG. 7. It is noted that this flow shall be periodically repeated.

[Step S31]

In step S31, the departure management part 16*d* determines whether or not an instruction to register a landing call has been received from the unit allocation part 31*b* of the management control section 31'. In a case where it is determined that the instruction has been received (YES), the car 10*a* is caused to travel to a floor where the instruction to register a landing call has been issued, and the control process moves on to step S32. On the other hand, In a case where it is determined that no registration has been made (NO), the process ends.

[Step S32]

In step S32, in a case where the departure management part 16*d* determines that the car 10*a* has arrived on the floor where the instruction to register a landing call has been issued and the door of the car 10*a* has been opened (YES), the process moves on to the next step S33; in a case where the door has not been opened (NO), the process ends.

[Step S33]

In step S33, to determine whether or not the inside of the car 10*a* of the elevator unit 10 is in a crowded state, the full-car determination part 16*b* determines whether or not an in-car density value exceeds a full-car threshold. Here, the in-car density value and the full-car threshold are values described in step S23 of the second embodiment (see FIG. 5), and thus their description is omitted here.

However, the full-car threshold is a reference full-car threshold set in advance as a value in a case where full-car passage is performed in normal operation, or is a full-car threshold rewritten to a value different from the preset reference value. It is not only simply rewritten but also set to a numerical value lower than the reference value, thereby a use scene in which an in-car crowded state is detected is assumed. In this case, the setting holding part 16*a* holds rewriting information in a case where the reference full-car threshold is rewritten.

In a case where the full-car determination part 16*b* determines that an in-car density value exceeds the full-car threshold with reference to the information held by the setting holding part 16*a* (YES), the process moves on to step S34; in a case where it is determined that the in-car density value does not exceed the full-car threshold (NO), the process moves on to step S36.

[Step S34]

In step S34, the full-car determination part 16*b* determines whether or not the full-car threshold used for the determination in step S33 has been corrected. In a case where the full-car threshold held by the setting holding part 16*a* includes rewriting information, the full-car determination part 16*b* determines that it has been rewritten (YES), and the process moves on to step S35. On the other hand, in a case where the full-car threshold held by the setting holding part 16*a* does not include rewriting information, the full-car determination part 16*b* determines that it has not been rewritten (NO), and the process moves on to step S36.

[Step S35]

In step S35, the full-car determination part 16*b* transmits a full-car signal including the rewriting information to the management control section 31'. The full-car signal including the rewriting information here is a full-car signal for informing that the in-car density value exceeds the full-car threshold and information indicating that the full-car threshold has been rewritten.

[Step S36]

In step S36, the departure management part 16*d* closes the door of the car 10*a*, and then causes the car 10*a* to travel toward the registered destination floor. After that, the process ends.

<Control by Operation Management Device 30' (FIG. 8)>

Figure 8:
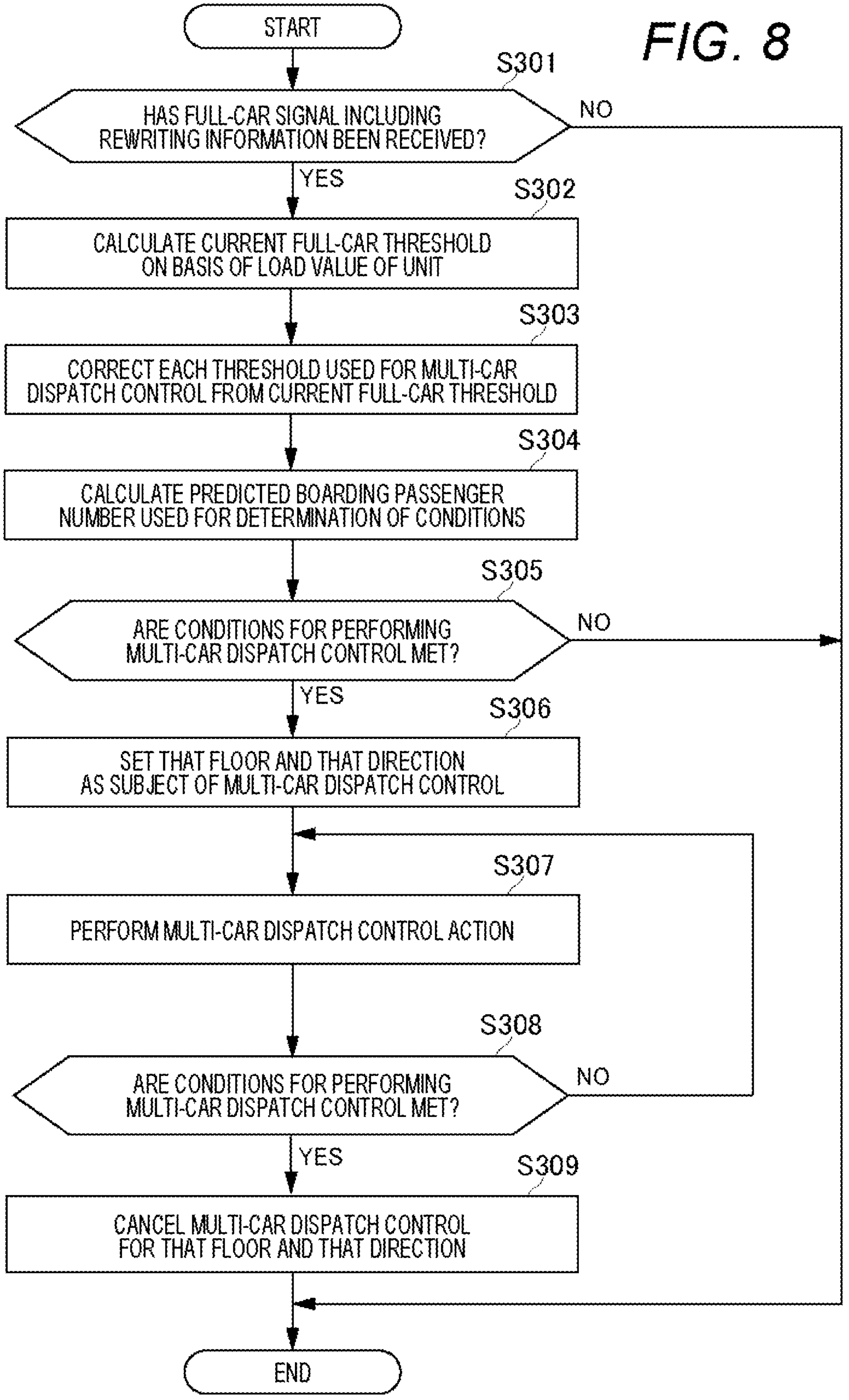
FIG. 8 is a flowchart showing, of the control method for the elevator according to the third and fourth embodiments, multi-car dispatch control performed by the operation management device.

FIG. 8 is a flowchart showing, of the control method for the elevator according to the third embodiment, control performed by the operation management device. With reference to FIG. 7, the control by the operation management device in the control method for the elevator of the third embodiment is described below in the order in accordance with the flowchart of FIG. 8. It is noted that these flows shall be periodically repeated.

[Step S301]

In step S301, the input information processing part 31*a* determines whether or not a full-car signal including rewriting information has been received from the elevator unit Here, it is assumed that a full-car signal including rewriting information has been received from, for example, the first unit 10-1. This full-car signal including rewriting information is a signal transmitted from the full-car determination part 16*b* of the unit control section 16 in step S35 of FIG. 7. In step S301, in a case where the input information processing part 31*a* determines that the full-car signal including the rewrite information has been received (YES), the process moves on to step S302, otherwise the process ends.

[Step S302]

In step S302, the threshold correction part d1 of the multi-car dispatch control part 31*d*' calculates, on the basis of a load value of the inside of the car transmitted from the first unit 10-1, the current full-car threshold that is a full-car threshold set with respect to the first unit 10-1 and is one that the reference full-car threshold has been rewritten to. It is noted that in a case where the management control section 31' can directly acquire the value of the rewritten full-car threshold from the unit control section 16 of the elevator unit 10, this step S302 may be omitted.

[Step S303]

In step S303, the threshold correction part d1 of the multi-car dispatch control part 31*d*' corrects each threshold used for multi-car dispatch control on the basis of the current full-car threshold calculated in step S302. Here, for example, with [the current full-car threshold]/[the full-car threshold before correction (the reference value)] as a coefficient, the threshold correction part d1 corrects each threshold by multiplying each threshold before rewriting by this coefficient.

[Step S304]

In step S304, the multi-car dispatch control determination part d2 of the multi-car dispatch control part 31*d*' calculates a predicted boarding passenger number to be used for multi-car dispatch control in each landing. The predicted boarding passenger number here is a predicted value of the number of passengers boarding the car 10*a* that travels from each floor heading in each direction in each time slot of a predetermined unit. Here, for example, a predicted boarding passenger number created by the learning section 32 on the basis of operation data of the elevator 1 accumulated in the past is used.

[Step S305]

In step S305, the multi-car dispatch control determination part d2 of the multi-car dispatch control part 31*d*' determines whether or not any of the landing floors meets conditions for performing the multi-car dispatch control. For example, it is determined by whether or not a predicted boarding passenger number on the floor exceeds the corrected threshold. The corrected threshold here is the one calculated in step S303, and the predicted boarding passenger number is the one calculated in step S304. An object to be compared may be the number of left-behind passengers on the floor, the number of boarding passengers on the floor at the time of the last departure, etc. Alternatively, it may be determined by whether or not a new landing call heading in the same direction (the direction) has been made on the floor until a predetermined time (for example, 5 seconds) has passed since the departure of, for example, the first unit 10-1 from the floor. Alternatively, it may be determined by a combination of these multiple conditions. In a case where the multi-car dispatch control determination part d2 determines that the conditions for performing the multi-car dispatch control are met (YES), the process moves on to step S306, otherwise the process ends.

[Step S306]

In step S306, the multi-car dispatch control determination part d2 of the multi-car dispatch control part 31*d*' sets the direction on the floor determined to meet the conditions for performing the multi-car dispatch control in the determination in step S305 as the subject of multi-car dispatch control.

[Step S307]

In step S307, the multi-car dispatch control determination part d2 of the multi-car dispatch control part 31*d*' performs multi-car dispatch control operation on the landing floor determined to be the subject of multi-car dispatch control in step S306. For example, the multi-car dispatch control determination part d2 of the multi-car dispatch control part 31*d*' keeps dispatching a certain number of elevator units 10 to the floor at all times. Here, the number of cars to be dispatched, i.e., the number of cars of the elevator units 10 to be dispatched to the landing floor may be determined from a magnitude relationship between a predicted boarding passenger number on the floor and the threshold. The threshold is the one calculated in step S303, and the predicted boarding passenger number is the one calculated in step S304.

[Step S308]

In step S308, the multi-car dispatch control determination part d2 of the multi-car dispatch control part 31*d*' determines whether or not the landing floor set as the subject of multi-car dispatch control in step S306 meets conditions for termination of the multi-car dispatch control. For example, it is determined by whether or not there is any unit waiting for the door to be closed on the floor. In a case where the multi-car dispatch control determination part d2 determines that the conditions for performing multi-car dispatch control are met (YES), the process moves on to step S309, otherwise the process returns to step S307.

[Step S309]

In step S309, the multi-car dispatch control determination part d2 of the multi-car dispatch control part 31*d*' cancels the setting of multi-car dispatch control of the landing floor set in step S306, and the process ends.

Effects of Third Embodiment

According to the third embodiment described above, even in a case where the full-car threshold for determining a crowded state of the inside of the car 10*a* is changed, the multi-car dispatch control part 31*d*' corrects the threshold used for multi-car dispatch control, which makes it possible to determine whether to perform multi-car dispatch control in accordance with the rewritten full-car threshold and dispatch a necessary number of cars that is just the right amount of cars to the target floor. Thus, by changing the full-car threshold, it becomes possible to perform multi-car dispatch control that can resolve a crowded state in the landing while keeping the social distance between passengers in the car 10*a* in a state that conforms with the world affairs.

Fourth Embodiment

The fourth embodiment is a modification example of the third embodiment, and is a configuration example where a full-car threshold used for determination in a case where full-car passage is performed in normal operation is changed to a value different from a reference value, for example, for the purpose of ensuring the social distance between passengers.

As shown in FIG. 6, the elevator 1' of the fourth embodiment differs from the configuration of the third embodiment in that the multi-car dispatch control part 31*d*' is further provided with the predicted boarding passenger number correction part d3. A configuration of the predicted boarding passenger number correction part d3 is described in detail in the control method for the elevator described later. Furthermore, the procedure of control executed by each part of the multi-car dispatch control part 31*d*' is different from that of the third embodiment. Therefore, only a control method for the elevator is described below.

Control Method for Elevator of Fourth Embodiment

The control method for the elevator of the fourth embodiment is a modification example of the control method for the elevator of the third embodiment, and a control method for the elevator unit implemented by the unit control section 16 is similar to the control method in the third embodiment described with reference to FIG. 7. Therefore, description of control of the elevator unit by the unit control section 16 is omitted here, and only each control by the operation management device 30' is described.

<Control by Operation Management Device 30'>

In this fourth embodiment, the operation management device 30' performs: (1) multi-car dispatch control associated with correction of a predicted boarding passenger number; and (2) correction of the predicted boarding passenger number after performing of the multi-car dispatch control in this order. These are described below in order.

(1) Multi-Car Dispatch Control Associated with Correction of Predicted Boarding Passenger Number Of the control method for the elevator according to the fourth embodiment, the procedure of multi-car dispatch control performed by the operation management device is described on the basis of the flow of FIG. 8. Here, a method of calculating a predicted boarding passenger number in step S304 is different from that of the third embodiment. Therefore, step S304 is described with FIG. 9 where the control flow is subdivided. FIGS. 10A to 10D are diagrams illustrating correction of the predicted boarding passenger number in the fourth embodiment.

Figure 9:
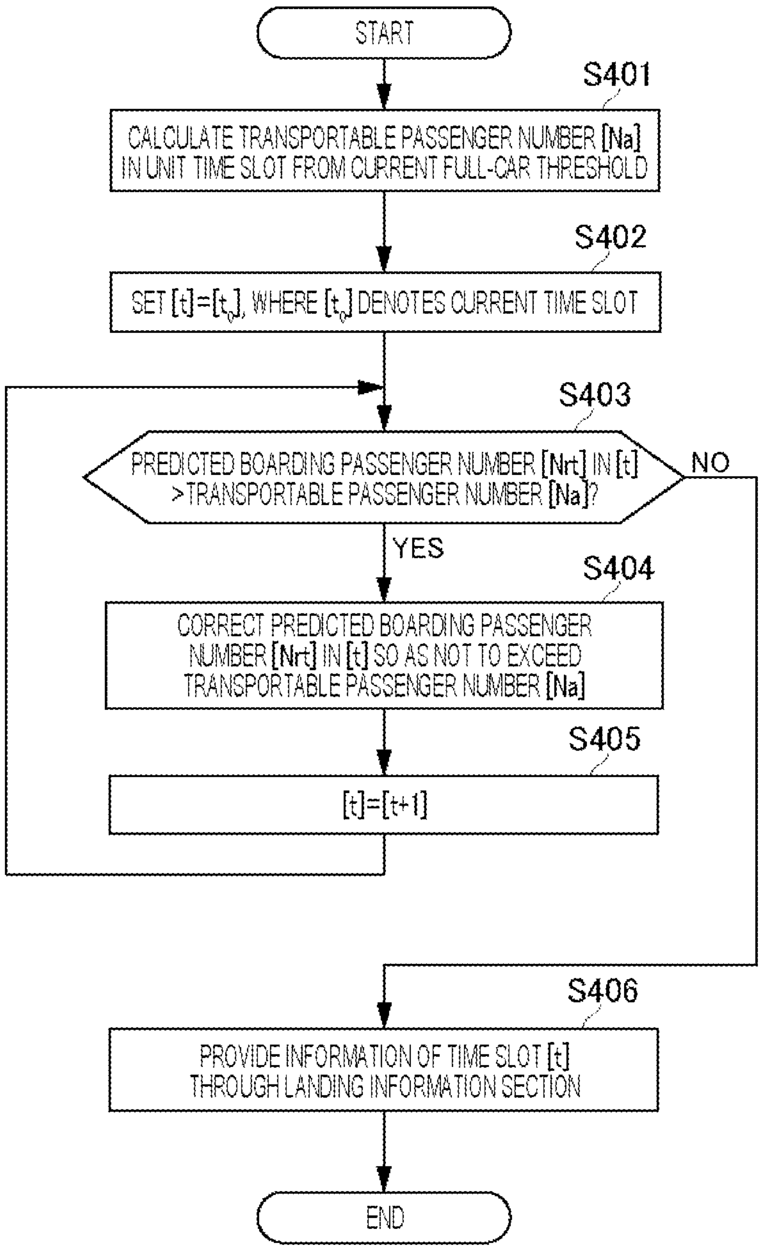
FIG. 9 is a flowchart showing, of the control method for the elevator according to the fourth embodiment, correction of a predicted boarding passenger number for the multi-car dispatch control performed by the operation management device.

With reference to FIGS. 6 and 10, the correction of the predicted boarding passenger number for the multi-car dispatch control performed by the operation management device is described below in the order in accordance with the flowchart of FIG. 9 that the control method of step S304 in FIG. 8 is further subdivided. It is noted that the flow of FIG. 9 shall be periodically repeated.

[Step S401]

Figure 10A:
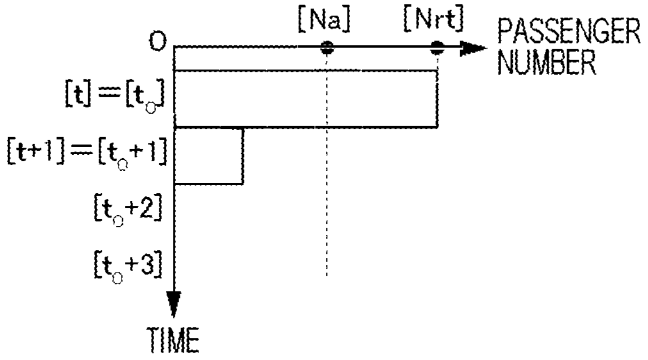
FIGS. 10A to 10D are diagrams illustrating the correction of the predicted boarding passenger number in the fourth embodiment.
Figure 10B:
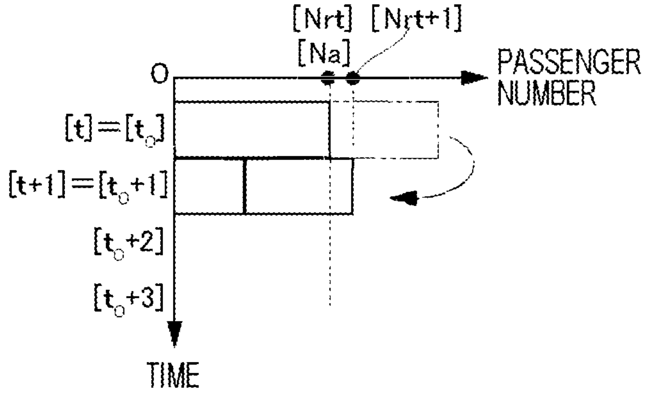

In step S401, the predicted boarding passenger number correction part d3 of the multi-car dispatch control part 31*d*' calculates a transportable passenger number [Na] per unit time slot from the current full-car threshold calculated by the threshold correction part d1 in step S302 (see FIG. 10A). In this case, the predicted boarding passenger number correction part d3 calculates the stop probability, for example, by traffic calculation, and calculates a round-trip time from the calculated stop probability, a travel distance, a travel time, and [capacity]×[full-car rate], and then calculates a transportable passenger number [Na] per unit time slot in terms of the number of elevator units. Furthermore, the predicted boarding passenger number correction part d3 may calculate a transportable passenger number [Na] using [number of times of departures]×[capacity]×[full-car rate] on the basis of respective logs of the number of departures on each floor. Moreover, the predicted boarding passenger number correction part d3 may calculate a transportable passenger number [Na] by calculating the number of times of departures from situations of learning an actual traveling time of the car 10*a*, a landing call, and a car call.

[Step S402]

In step S402, the predicted boarding passenger number correction part d3 of the multi-car dispatch control part 31*d*' performs a process of setting a time slot [t] to the current time slot [$t_0$] ([t]=[$t_0$]) (FIG. 10A).

[Step S403]

In step S403, the predicted boarding passenger number correction part d3 of the multi-car dispatch control part 31*d*' determines whether or not a predicted boarding passenger number [Nrt] in a time slot [t] created by the learning section 32 exceeds the transportable passenger number [Na] calculated in step S401 in the time slot [t] (first, a time slot [to]) (see FIG. 10A). In a case where the predicted boarding passenger number correction part d3 determines that it exceeds the transportable passenger number [Na] (YES), the process moves on to step S404; in a case where it is determined that it does not exceed the transportable passenger number [Na] (NO), the process moves on to step S406.

[Step S404]

In step S404, the predicted boarding passenger number correction part d3 of the multi-car dispatch control part 31*d*' corrects so that the predicted boarding passenger number [Nrt] in the time slot [t] (first, the time slot [$t_0$]) does not exceed the transportable passenger number [Na]. For example, the predicted boarding passenger number [Nrt] in the time slot [t] (first, the time slot [$t_0$]) is corrected (see FIG.

10B). Next, a predicted boarding passenger number [Nrt+1]=[Nrt+1]+[Nrt]−[Na] in the next time slot [t+1] is corrected (see FIG. 10B).

[Step S405]

Figure 10C:
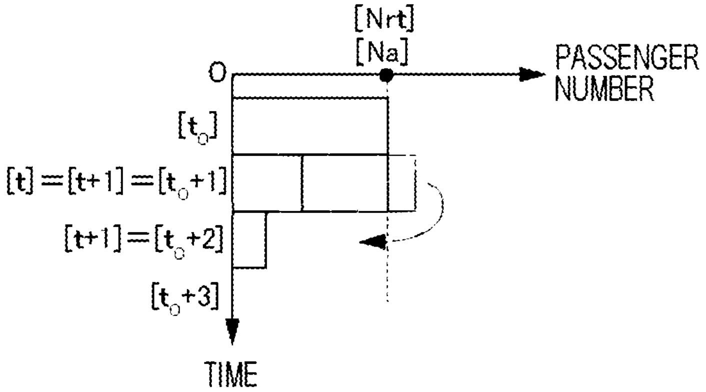
Figure 10D:
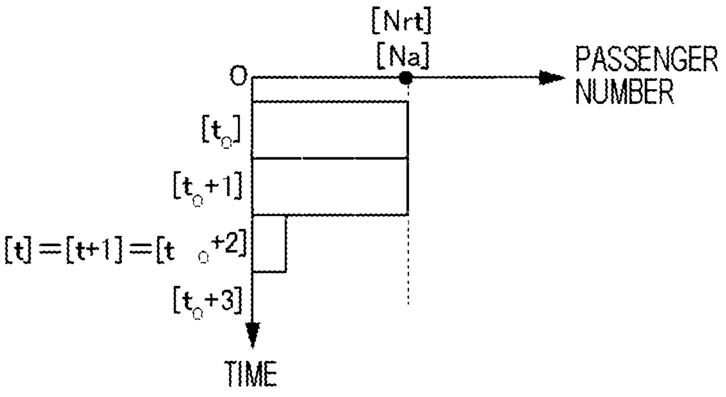

In step S405, the predicted boarding passenger number correction part d3 of the multi-car dispatch control part 31*d'* performs a process of setting the time slot [t] to the next time slot [t+1] ([t]=[t+1]) (see FIG. 10C). After that, returning to step S403, the predicted boarding passenger number correction part d3 repeats steps S404 to S405 until it is determined in step S403 that the predicted boarding passenger number [Nrt] in the time slot [t] does not exceed the transportable passenger number [Na] calculated in step S401 (NO) (see FIG. 10D).

[Step S406]

Step S406 is a step to which the process moves on when it is determined in step S403 that the predicted boarding passenger number [Nrt] in the time slot [t] does not exceed the transportable passenger number [Na] (NO). In this step S406, the landing output control part 31*c* instructs the landing information section 24 to give information to inform of the time slot [t]. The time slot [t] informed here is a time slot in which all passengers heading in the direction in the landing complete boarding the car 10*a*, and is a time slot [$t_0$+2] in the example shown in FIGS. 10A to 10D. The informing here shall continue for a fixed period of time. Furthermore, the passage of the time slot [t] here may be set as a condition for performing multi-car dispatch control in step S308. After this step S406, the process ends.

[Effects of (1) Multi-car Dispatch Control Associated with Correction of Predicted Boarding Passenger Number]

As described above, in a case where the full-car threshold is rewritten, the predicted boarding passenger number [Nrt] used for multi-car dispatch control is corrected on the basis of the rewritten full-car threshold, thereby multi-car dispatch control can be performed in accordance with the rewritten full-car threshold. Furthermore, correction of the predicted boarding passenger number makes it possible to perform multi-car dispatch control taking into consideration passengers likely to be present in a case of operation based on the rewritten full-car threshold even in a time slot in which no passengers are predicted in a case of operation based on the reference full-car threshold. Moreover, it is possible to predict a time slot in which all passengers in the landing complete boarding the car, and therefore, by performing multi-car dispatch control until that time slot has passed, it becomes possible to resolve a crowded state in the landing. By informing of that time slot through the landing information section, it becomes possible to provide a user who has arrived at a landing with information for making a decision when a means of transportation in a building is selected.

Figure 11:
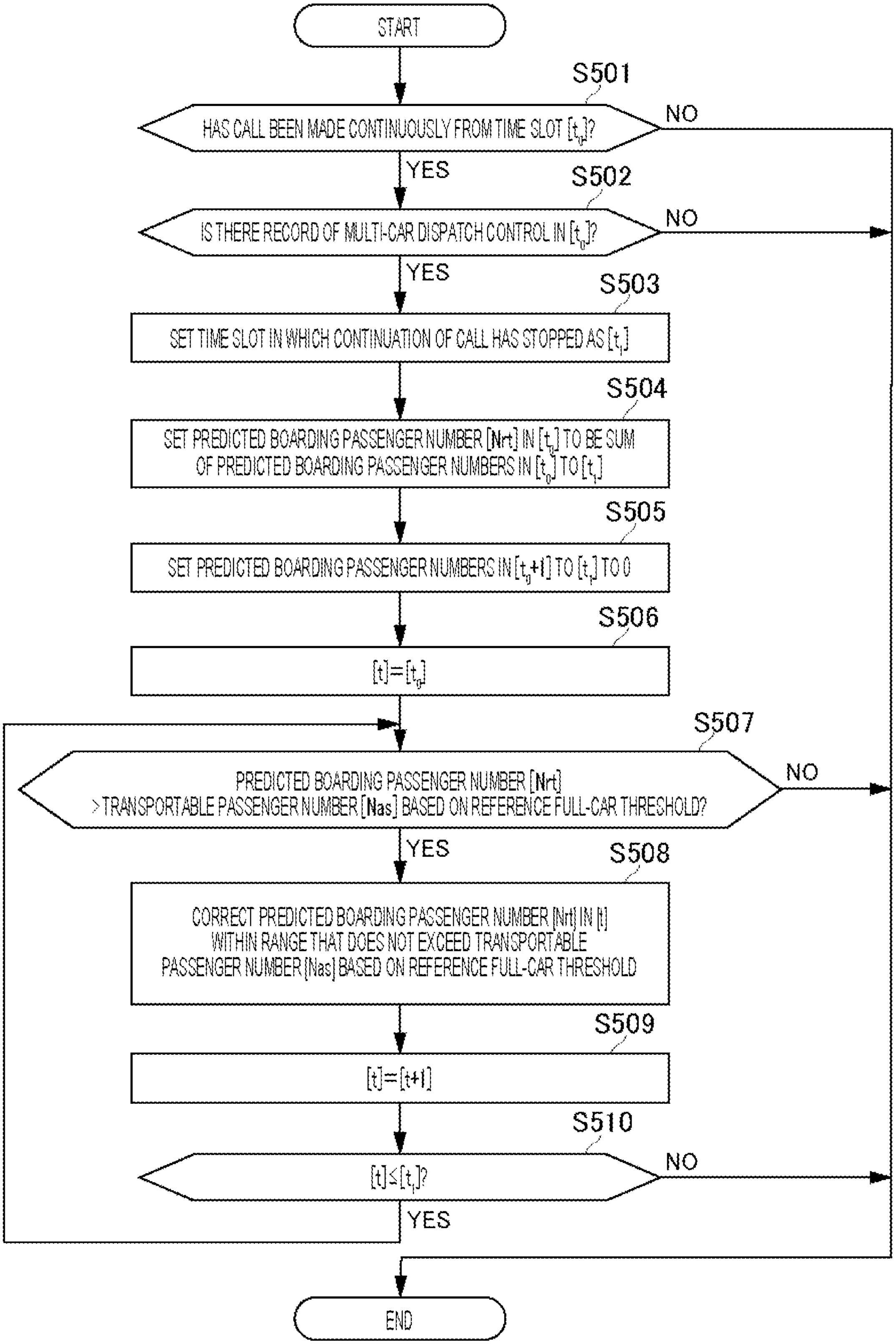
FIG. 11 is a flowchart showing, of the control method for the elevator according to the fourth embodiment, correction of the predicted boarding passenger number after performing of the multi-car dispatch control performed by the operation management device.

(2) Correction of Predicted Boarding Passenger Number After Performing of Multi-car Dispatch Control FIG. 11 is a flowchart showing, of the control method for the elevator according to the fourth embodiment, correction of the predicted boarding passenger number after performing of the multi-car dispatch control performed by the operation management device. Furthermore, FIGS. 12A to 12E are diagrams illustrating correction of the predicted boarding passenger number after performing of the multi-car dispatch control performed by the operation management device of the fourth embodiment. The predicted boarding passenger number to be corrected here is the predicted boarding passenger number [Nrt] corrected for determination of the multi-car dispatch control described with FIGS. 9 and 10.

With reference to FIGS. 6 and 12, the correction of the predicted boarding passenger number for the multi-car dispatch control performed by the operation management device is described below in the order in accordance with the flowchart of FIG. 11. It is noted that the flow of FIG. 11 shall be periodically repeated.

[Step S501]

In step S501, the predicted boarding passenger number correction part d3 of the multi-car dispatch control part 31*d'* determines whether or not a landing call has continuously been made from the time slot [$t_0$]. At this time, in a case where a landing call heading in each direction on each floor has been made continuously from the time slot [$t_0$] to the next time slot [$t_0$+1] and onward, the predicted boarding passenger number correction part d3 determines that the landing call has been made continuously (YES), and the process moves on to step S502, otherwise the process ends.

[Step S502]

In step S502, the predicted boarding passenger number correction part d3 of the multi-car dispatch control part 31*d'* determines whether or not there is a record of performance of multi-car dispatch control in the time slot [$t_0$]; in a case where it is determined that there is a record (YES), the process moves on to step S503, otherwise the process ends.

[Step S503]

Figure 12A:
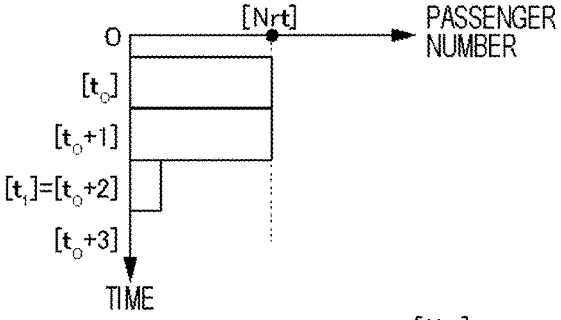
FIGS. 12A to 12E are diagrams illustrating the correction of the predicted boarding passenger number after performing of the multi-car dispatch control performed by the operation management device of the fourth embodiment.

In step S503, the predicted boarding passenger number correction part d3 of the multi-car dispatch control part 31*d'* sets a time slot (here, the time slot [$t_0$+2]) in which the continuation of the landing call has stopped as a time slot [$t_1$] (see FIG. 12A).

[Step S504]

Figure 12B:
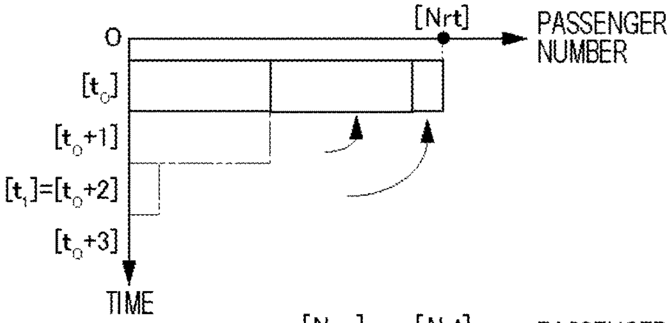

In step S504, the predicted boarding passenger number correction part d3 of the multi-car dispatch control part 31*d'* sets the predicted boarding passenger number [Nrt] in the time slot [$t_0$] to be the sum of predicted boarding passenger numbers [Nrt] in the time slots [$t_0$] to [$t_1$] (see FIG. 12B).

[Step S505]

Figure 12C:
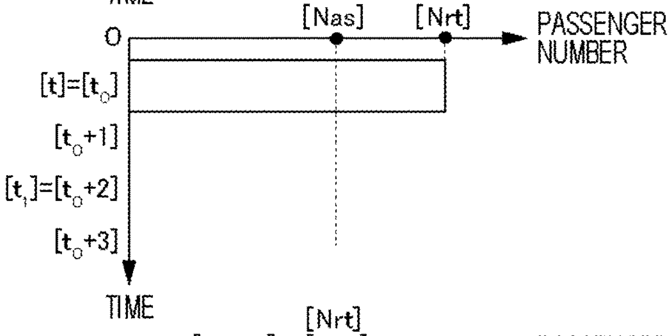

In step S505, the predicted boarding passenger number correction part d3 of the multi-car dispatch control part 31*d'* sets each predicted boarding passenger number [Nrt] in the time slots [$t_0$+1] to [$t_1$] to zero (see FIG. 12C).

[Step S506]

In step S506, the predicted boarding passenger number correction part d3 of the multi-car dispatch control part 31*d'* performs a process of setting the time slot [$t_0$] to [t] ([t]=[$t_0$]) (see FIG. 12C).

[Step S507]

In step S507, the predicted boarding passenger number correction part d3 of the multi-car dispatch control part 31*d'* determines whether or not the predicted boarding passenger number [Nrt] in the time slot [t] exceeds a transportable passenger number [Nas] based on the reference full-car threshold (see FIG. 12C). The reference full-car threshold here shall be a full-car threshold that is not rewritten. The predicted boarding passenger number correction part d3 adopts, as the reference full-car threshold, the maximum value of the full-car thresholds calculated in the past or a value obtained by calculating backwards from the current full-car threshold. The current full-car threshold is a corrected value calculated in step S302 shown in FIG. 8. In a case where the predicted boarding passenger number correction part d3 determines that the predicted boarding passenger number [Nrt] exceeds the transportable passenger number [Nas] based on the reference full-car threshold (YES), the process moves on to step S508; in a case where it is determined that the predicted boarding passenger number [Nrt] does not exceed the transportable passenger number [Nas] based on the reference full-car threshold (NO), the process ends.

[Step S508]

Figure 12D:
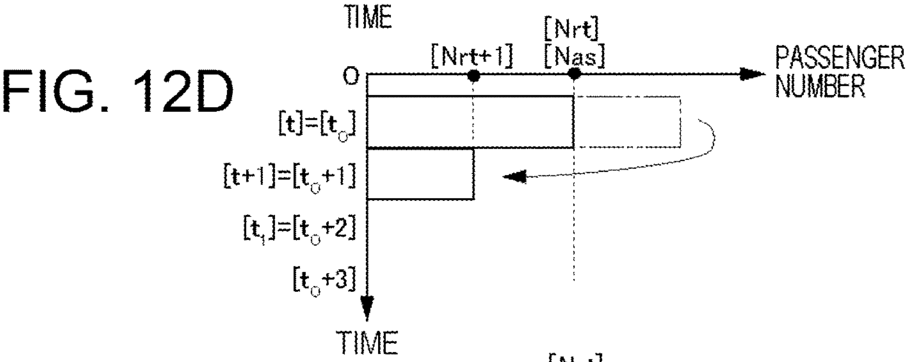

In step S508, the predicted boarding passenger number correction part d3 of the multi-car dispatch control part 31*d*' corrects the predicted boarding passenger number [Nrt] in the time slot [t] (first, the time slot [$t_0$]) so as not to exceed the transportable passenger number [Nas] based on the reference full-car threshold (see FIG. 12D). For example, the predicted boarding passenger number [Nrt] in the time slot [t] (first, the time slot [$t_0$]) is corrected to the transportable passenger number [Nas] based on the reference full-car threshold. Then, the predicted boarding passenger number [Nrt+1] in the next time slot [t+1] subsequent to the time slot [t] is corrected to [Nrt+1]=[Nrt]−[Nas] (see FIGS. 12D and 12E). [Nrt] is a value before the correction in step S508 and is the sum in step S504.

[Step S509]

Figure 12E:
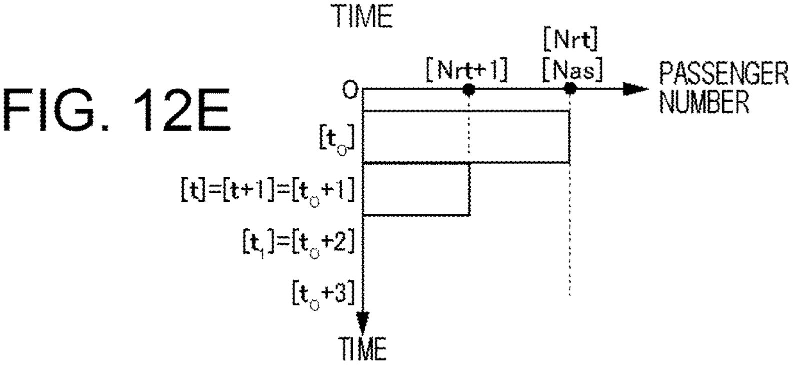

In step S509, the predicted boarding passenger number correction part d3 of the multi-car dispatch control part 31*d*' performs a process of setting the time slot [t] to the next time slot [t+1] ([t]=[t+1]) (see FIG. 12E).

[Step S510]

In step S510, the predicted boarding passenger number correction part d3 of the multi-car dispatch control part 31*d*' determines whether or not the time slot [t] is the time slot [$t_1$] or before; in a case where it is determined that the time slot [t] is the time slot [$t_1$] or before (YES), the process returns to step S507, and after that, step S507 and subsequent steps are repeated. On the other hand, in a case where the predicted boarding passenger number correction part d3 determines that the time slot [t] is not the time slot [$t_1$] or before (NO), the process ends.

[Effects of (2) Correction of Predicted Boarding Passenger umber After Performing of Multi-Car Dispatch Control]

As described above, the predicted boarding passenger number correction part d3 recorrects the predicted boarding passenger number [Nrt] corrected for performing the multi-car dispatch control in accordance with the rewritten full-car threshold on the basis of the reference full-car threshold before the rewriting, and therefore, the predicted boarding passenger number [Nrt] can be brought closer to the value before the correction created by the learning section 32. Therefore, even in a case where the rewriting of the full-car threshold is canceled, it is possible to perform the multi-car dispatch control in accordance with the reference full-car threshold.

It is noted that the present invention is not limited to the above-described embodiments and their modification examples, and further includes various modification examples. For example, the above-described embodiments are described in detail to explain the present invention in a comprehensible way, and the present invention is not necessarily limited to those including all the components described above. Furthermore, some of the components of one embodiment can be replaced with those of another embodiment, and a component of another embodiment can be added to the components of one embodiment. Moreover, addition of another component, deletion, and replacement can be made with respect to some of the components of each embodiment. For example, the setting and cancellation of the multi-car dispatch control described in the third and fourth embodiments may be performed by other methods; for example, in a case where the number of people in a landing can be detected by the landing camera 22, the detected number of people may be set as the number of left-behind passengers, and the setting and cancellation of the multi-car dispatch control may be performed on the basis of the number of left-behind passengers.

REFERENCE SIGNS LIST

1, 1' elevator
10 elevator unit
10-1 to 10-*n* first unit to n-th unit
10*a* car
15 speaker
16 unit control section
16*a* setting holding part
16*b* full-car determination part
16*c* output control part
30' operation management device
31*b* unit allocation part
31*d*, 31*d*' multi-car dispatch control part
32 learning section
d1 threshold correction part
d2 multi-car dispatch control determination part
d3 predicted boarding passenger number correction part

The invention claimed is:

1. An elevator comprising:

a plurality of elevator units each including a car and a unit control section that controls operation of the car; and an operation management device that manages operation of the plurality of elevator units, wherein, in a case where it is determined that any of the elevator units has left any of passengers behind, the operation management device additionally and immediately dispatches the car of another elevator unit to a floor where any of passengers has been left behind, the operation management device corrects a predicted boarding passenger number using a full-car threshold, and performs an immediate car dispatch control on a basis of the corrected predicted boarding passenger number, in a case where the immediate car dispatch has been performed, the operation management device corrects the predicted boarding passenger number on a basis of a reference full-car threshold, and the operation management device calculates a transportable passenger number per unit time slot on a basis of the reference full-car threshold, and corrects the predicted boarding passenger number to be at a maximum of the calculated transportable passenger number.

2. The elevator according to claim 1, wherein in a case where it is determined that the car of any of the elevator units is in a full-car state, the operation management device determined that any of the passengers is left behind.

3. The elevator according to claim 1, wherein after it is determined that the car of any of the elevator units is in a full-car state, in a case where a load value of the car decreases, the operation management device determines that any of the passengers is left behind.

4. The elevator according to claim 2, wherein the full-car state is a state in a case where it is determined that an in-car density value exceeds a predetermined threshold.

5. The elevator according to claim 4, wherein the in-car density value is a boarding passenger number, and is a value in a case where it is determined that capacity of the elevator exceeds a predetermined threshold.

6. The elevator according to claim 4, wherein the in-car density value is an exposed floor area ratio, and is a value in a case where it is determined that an unexposed floor area exceeds a predetermined threshold.

7. The elevator according to claim 2, wherein each of the elevator units includes an informing device for informing passengers in the car of information, and the informing device informs of a full-car state in a case where the operation management device has determined that the car is in the full-car state.

8. The elevator according to claim 1, wherein the operation management device determines presence of left-behind passenger(s) by detection of passenger(s) in a landing.

9. The elevator according to claim 1, wherein in a case where it is determined that there is no allocatable elevator unit when the car is to be immediately dispatched, the operation management device re-registers a landing call to an arrival floor of the car determined to have left any of the passengers behind, and puts allocation of the re-registered landing call on hold.

10. An elevator comprising:

a plurality of elevator units each including a car and a unit control section that controls operation of the car; and an operation management device that manages operation of the plurality of elevator units, wherein the operation management device includes a multi-car dispatch control part that controls immediate car dispatch to a given landing floor, the multi-car dispatch control part corrects a threshold used in multi-car dispatch control using a full-car threshold, and, on a basis of the threshold used in the multi-car dispatch control, determines whether to perform the immediate car dispatch and calculate a number of cars to be dispatched in the immediate car dispatch, the operation management device corrects a predicted boarding passenger number using the full-car threshold, and performs the immediate car dispatch control on a basis of the corrected predicted boarding passenger number, in a case where the immediate car dispatch has been performed by the multi-car dispatch control, the operation management device corrects the predicted boarding passenger number used in control by the multi-car dispatch control part on a basis of a reference full-car threshold before rewriting, and the operation management device calculates a transportable passenger number per unit time slot on a basis of the reference full-car threshold, and corrects the predicted boarding passenger number to be at a maximum of the calculated transportable passenger number.

11. The elevator according to claim 10, wherein the operation management device calculates a transportable passenger number per unit time slot on a basis of the full-car threshold, and corrects the predicted boarding passenger number to be at a maximum of the calculated transportable passenger number.

12. The elevator according to claim 10, wherein the operation management device calculates a time slot in which all passengers of the predicted boarding passenger number complete boarding the car on a basis of the corrected predicted boarding passenger number.

13. The elevator according to claim 12, wherein each of the elevator units includes an informing device for informing waiting passengers in a landing of information, and the informing device informs of a time slot in which all passengers of the predicted boarding passenger number calculated by the operation management device complete boarding the car.

14. A control method for an elevator, the elevator including:

a plurality of elevator units each including a car and a unit control section that controls operation of the car; and an operation management device that manages operation of the plurality of elevator units, the control method comprising, in a case where it is determined that any of the elevator units has left any of passengers behind, additionally and immediately dispatching the car of another elevator unit to a floor where any of passengers has been left behind, by the operation management device, wherein the operation management device corrects a predicted boarding passenger number using a full-car threshold, and performs an immediate car dispatch control on a basis of the corrected predicted boarding passenger number, in a case where the immediate car dispatch has been performed, the operation management device corrects the predicted boarding passenger number on a basis of a reference full-car threshold, and wherein the operation management device calculates a transportable passenger number per unit time slot on a basis of the reference full-car threshold, and corrects the predicted boarding passenger number to be at a maximum of the calculated transportable passenger number.

15. A control method for an elevator, the elevator including:

a plurality of elevator units each including a car and a unit control section that controls operation of the car; and an operation management device that manages operation of the plurality of elevator units, the operation management device including a multi-car dispatch control part that controls immediate car dispatch to a given landing floor, the control method comprising, by the multi-car dispatch control part, correcting a threshold used in multi-car dispatch control using a full-car threshold, and on a basis of the threshold used in the multi-car dispatch control, determining whether to perform the immediate car dispatch and calculating a number of cars to be dispatched in the immediate car dispatch, wherein the operation management device corrects a predicted boarding passenger number using the full-car threshold, and performs the immediate car dispatch control on a basis of the corrected predicted boarding passenger number, in a case where the immediate car dispatch has been performed by the multi-car dispatch control, the operation management device corrects the predicted boarding passenger number used in control by the multi-car dispatch control part on a basis of a reference full-car threshold before rewriting, and wherein the operation management device calculates a transportable passenger number per unit time slot on a basis of the reference full-car threshold, and corrects the predicted boarding passenger number to be at a maximum of the calculated transportable passenger number.

* * * * *